UNITED STATES PATENT OFFICE.

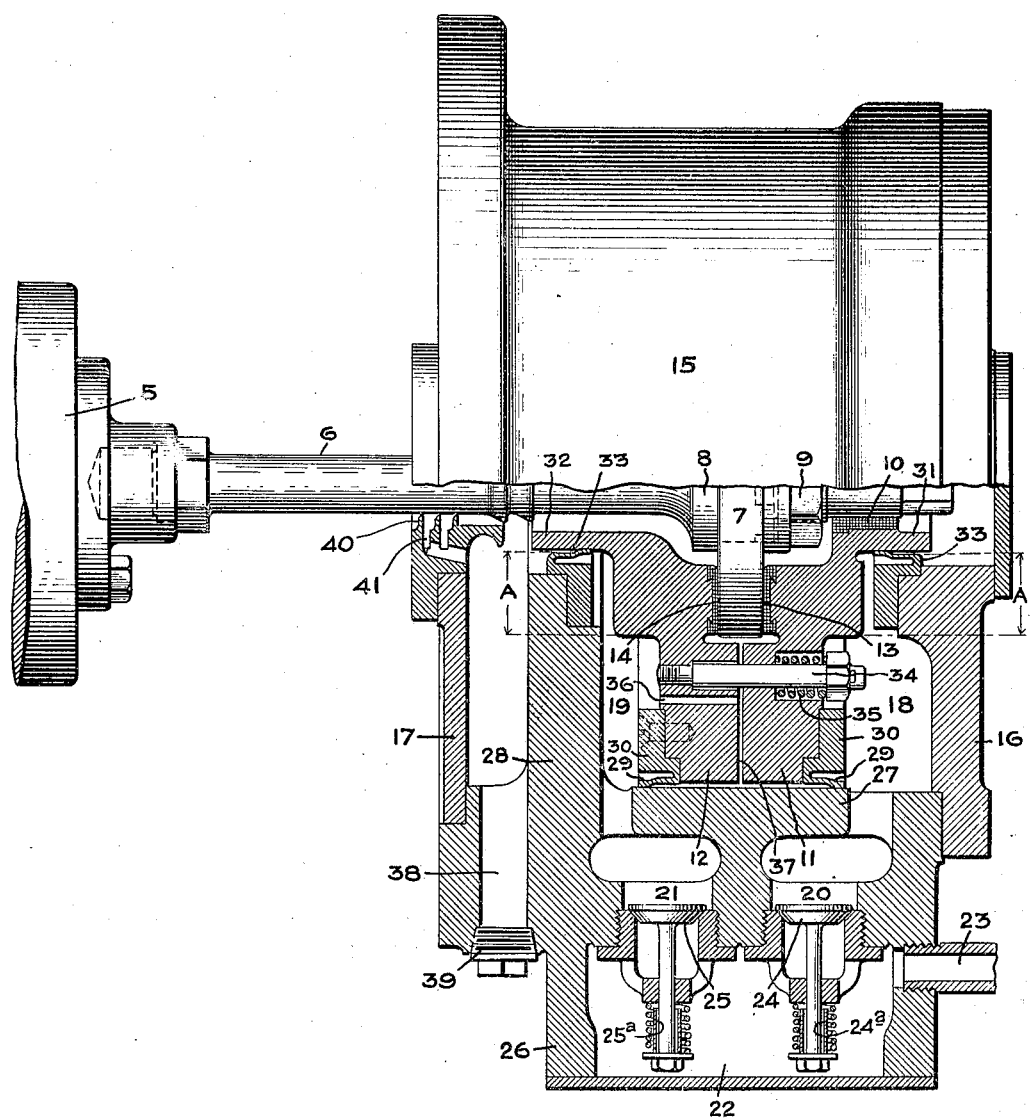

JOHN H. DORAN, OF SCHENECTADY, NEW YORK, ASSIGNOR TO GENERAL ELECTRIC COMPANY, A CORPORATION OF NEW YORK.

DASH-POT.

1,352,359. Specification of Letters Patent. Patented Sept. 7, 1920.

Application filed January 4, 1919. Serial No. 269,661.

*To all whom it may concern:*

Be it known that I, JOHN H. DORAN, a citizen of the United States, residing at Schenectady, in the county of Schenectady, State of New York, have invented certain new and useful Improvements in Dash-Pots, of which the following is a specification.

The present invention relates to dash-pots intended for use in reducing or dampening axial vibrations of a rotating member which has a limited amount of axial play. One application of my invention is in connection with elastic fluid turbines for reducing axial vibrations of the rotor or rotors thereof, and it is particularly intended for use with radial flow turbines having oppositely rotating wheels in which the axial thrust is balanced by means of pressure disks upon which elastic fluid acts, the pressure increasing and decreasing on such disks when the wheels move axially thereby maintaining such wheels in correct position.

The object of my invention is to provide an improved dash-pot of the above referred to character and for a consideration of what I believe to be novel and my invention, attention is directed to the accompanying description and the claims appended thereto.

In the drawing, the figure is a side elevation partly in vertical section of a dash-pot embodying my invention.

Referring to the drawing, 5 indicates a rotating shaft which may be, for example, the end of a turbine rotor shaft. Fixed to the end of shaft 5 is a shaft section 6 on which is a collar 7 held between a flange 8 formed integral with shaft section 6 and a nut 9. The extreme outer end of shaft section 6 is carried in a bearing 10 supported by the piston of the dash-pot. The piston of the dash-pot comprises two disks or plates 11 and 12 one on each side of collar 7. The disk 11 carries bearing 10 and has a bearing surface 13 which engages one side of collar 7, and the disk 12 has a bearing surface 14 which engages the other side of collar 7. The collar 7 accordingly rotates between the two disks 11 and 12 which go to make up the piston portion of the dash-pot. The piston moves in a cylinder 15 having heads 16 and 17 between which and the piston are pressure chambers 18 and 19.

Fuid under pressure, for example, oil, is admitted to chambers 18 and 19 through passages 20 and 21 which lead from a reservoir 22 to which fluid is supplied by a pipe 23. In passages 20 and 21 are spring pressed check valves 24 and 25 which prevent fluid escaping from chambers 18 and 19 back to reservoir 22. Surrounding the stems of valves 24 and 25 are collars 24$^a$ and 25$^a$ which form stops to limit the opening movement of the valves. Passages 20 and 21 and valves 24 and 25 are preferably formed in and carried by a valve chest 26 which fits into an opening at the lower side of cylinder 15. A portion of the cylinder in which the piston moves is thus formed by the upper wall 27 of valve chest 26 and preferably a portion of end wall 17 is formed integral with the valve chest as indicated at 28. Between the peripheries of disks 11 and 12 and the cylinder 15 are suitable packing means to minimize the leakage and preferably I employ yielding packing rings 29 which are carried by the piston and slide axially on the cylinder 15. Rings 29 may be formed, for example, by turning a groove in an annulus 30 near one edge thereof, the annulus being then bolted to the piston. Disks 11 and 12 are provided with annular projections 31 and 32 respectively, which extend through the bores of heads 16 and 17 which form the end walls of chambers 18 and 19, and between such projections and the bores of the heads are packing rings 33 which may be of the type just referred to. In each instance it will be noted that the packing rings face toward the pressure chambers so that the pressure therein tends to expand them into contact with the surfaces against which they pack.

Yieldingly connecting together the disks 11 and 12 are a suitable number of bolts 34 each of which is fixed at one end to disk 12 and has a nut at its other end between which and the disk 11 are springs 35, the springs being located in sockets in disk 11. In disk 12 are a number of holes 36 which connect pressure chamber 19 to the annular space 37 between disks 11 and 12. In end wall 17 is a drain reservoir 38 provided with an opening at its lower side closed by a plug 39. By removing plug 39 any liquid in reservoir 38 may be drained out. Between shaft 6 and end wall 17 is a suitable packing 40 arranged by means of opening 41 to drain back into reservoir 38.

In operation fluid under pressure is supplied to chambers 18 and 19 from reservoir 22, to which in turn fluid is supplied by pipe 23 which may be connected to a suitable pump, such as a gear pump, operated from shaft 5 or otherwise. Preferably the fluid utilized is oil. Pressure from chamber 19 passes through openings 36 to annular space 37 so that the pressure in this space is the same as that in chambers 18 and 19. However, the area of disks 11 and 12 exposed to the pressure in chambers 18 and 19 is greater than the area of the disks 11 and 12 exposed to the pressure in annular space 37 and as a result the pressure in chambers 18 and 19 acts to force disks 11 and 12 against collar 7. The differential area on which the pressure acts is indicated at A and as will be obvious the total pressure may be given the desired value by varying either the pressure per unit area or the total area on which it acts. The bearing surfaces 13 and 14 are thus held yieldingly in engagement with collar 7 and with sufficient force that disks 11 and 12 always follow its movements so that the apparatus will act promptly and in the usual manner to dampen vibrations. By this arrangement in case of wear the surfaces 13 and 14 will automatically adjust themselves and always remain in contact with collar 7. As a result all danger of the connection between the rotating collar 7 and the non-rotating disks 11 and 12 becoming loose due to wear so as to permit axial movement of the collar independently of disks 11 and 12 is eliminated. This is an important consideration because the axial vibrations are of but slight amplitude and it is essential that the dashpot function promptly and at all times if vibrations are to be dampened. The bolts 34 and springs 35 form a yielding connection between disks 11 and 12 to supplement that of the fluid pressure and the same are primarily useful to hold the two disks in place when there is no fluid pressure on them. When in operation sufficient fluid will leak from the annular space 37 between disk 7 and surfaces 13 and 14 to lubricate the same.

In addition to being self-adjusting to take care of any wear, the arrangement also has the advantage that it can very readily be made with sufficient area of bearing surfaces that the pressure per unit area is kept within permissible limits.

In accordance with the provisions of the patent statutes, I have described the principle of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:

1. In an apparatus of the character described, the combination of a rotating shaft, a collar thereon, a dash-pot comprising a cylinder member and a piston member, one of said members being formed in two parts which engage said collar on opposite sides, and means for yieldingly holding said parts in engagement with said collar.

2. In an apparatus of the character described, the combination of a rotating shaft, a collar thereon, a cylinder in which the collar rotates, a piston in the cylinder comprising two members, one located on each side of the collar, and means for holding the members in yielding engagement with the collar.

3. In an apparatus of the character described, the combination of a rotating shaft, a collar thereon, a cylinder in which the collar rotates, a piston in the cylinder comprising two members, one located on each side of the collar, and means for supplying fluid under pressure to the cylinder on opposite sides of the piston to hold the members in engagement with the collar.

4. In an apparatus of the character described, the combination of a rotating shaft, a collar thereon, a cylinder in which the collar rotates, a piston in the cylinder comprising two members, one located on each side of the collar, and means for supplying fluid under pressure to the cylinder on opposite sides of the piston to hold the members in engagement with the collar, said fluid also serving as operating fluid for the dash-pot.

5. In an apparatus of the character described, the combination of a rotating shaft, a collar thereon, a cylinder in which the collar rotates, a piston in the cylinder comprising two members, one located on each side of the collar, means for supplying fluid under pressure to the cylinder on opposite sides of the piston to hold the members in engagement with the collar, and spring means for also holding the members in engagement therewith.

6. In an apparatus of the character described, the combination of a rotating shaft, a collar thereon, a cylinder in which the collar rotates, a piston in the cylinder comprising two members, one located on each side of the collar, said cylinder having passages through which fluid is supplied to the cylinder on opposite sides of the piston, non-return valves in said passages, and means for supplying fluid under pressure to said passages.

7. In an apparatus of the character described, the combination of a rotating shaft, a collar thereon, a cylinder in which the collar rotates, a piston in the cylinder comprising two members, one located on each side of the collar and of greater diameter than the collar, means for supplying fluid under pressure to said cylinder on opposite sides of the piston, said piston having a passage through which fluid is admitted to the space between the two members beyond the periphery of the collar.

In witness whereof, I have hereunto set my hand this 3rd day of January, 1919.

JOHN H. DORAN.